(12) United States Patent
Puthillathe et al.

(10) Patent No.: US 9,817,468 B2
(45) Date of Patent: Nov. 14, 2017

(54) SYSTEM AND METHOD FOR AUTOMATIC DETECTION AND SWITCHING BETWEEN USB HOST AND DEVICE ROLLS ON A TYPE-A CONNECTOR

(71) Applicant: Dell Products, LP, Round Rock, TX (US)

(72) Inventors: Chandrasekhar Puthillathe, Bangalore (IN); Rajeshkumar I. Patel, Bangalore (IN); Shawn J. Dube, Austin, TX (US); Elie A. Jreij, Pflugerville, TX (US); Pablo A. Arias, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 305 days.

(21) Appl. No.: 14/171,340

(22) Filed: Feb. 3, 2014

(65) Prior Publication Data

US 2015/0220139 A1   Aug. 6, 2015

(51) Int. Cl.
| | |
|---|---|
| *G06F 13/20* | (2006.01) |
| *G06F 1/32* | (2006.01) |
| *G06F 11/30* | (2006.01) |
| *G06F 13/38* | (2006.01) |
| *G06F 13/40* | (2006.01) |

(52) U.S. Cl.
CPC ........ *G06F 1/3293* (2013.01); *G06F 11/3051* (2013.01); *G06F 13/385* (2013.01); *G06F 13/4022* (2013.01)

(58) Field of Classification Search
USPC ....... 710/16, 17, 18, 300, 302, 105, 110, 51, 710/305, 316; 713/340
See application file for complete search history.

(56) References Cited

U.S. PATENT DOCUMENTS

| | | | |
|---|---|---|---|
| 6,871,252 B1 * | 3/2005 | Cline | 710/313 |
| 7,214,089 B1 | 5/2007 | Learmonth et al. | |
| 7,506,077 B2 | 3/2009 | Hesse | |
| 7,802,047 B2 | 9/2010 | Chung et al. | |
| 2003/0101298 A1 | 5/2003 | Chang et al. | |
| 2005/0204070 A1 * | 9/2005 | Shaver | G06F 1/266 710/8 |
| 2006/0095595 A1 * | 5/2006 | Dalton et al. | 710/5 |
| 2006/0282567 A1 * | 12/2006 | Bhesania | G06F 11/3055 710/52 |
| 2008/0222438 A1 * | 9/2008 | Lin et al. | 713/340 |
| 2009/0138631 A1 * | 5/2009 | Hung | 710/48 |
| 2009/0228627 A1 * | 9/2009 | Huang et al. | 710/313 |
| 2012/0311207 A1 * | 12/2012 | Powers | G06F 13/385 710/106 |
| 2013/0238819 A1 * | 9/2013 | Oljaca et al. | 710/15 |
| 2015/0074323 A1 * | 3/2015 | Chumbalkar et al. | 710/316 |

\* cited by examiner

*Primary Examiner* — Raymond Phan
(74) *Attorney, Agent, or Firm* — Larson Newman, LLP

(57) ABSTRACT

An information handling system includes a system processor including a first Universal Serial Bus (USB) host interface, a service processor including a second USB host interface and a USB device interface, and a USB socket. The service processor couples a first USB device that is plugged into the USB socket to the first USB host interface, couples a second USB device that is plugged into the USB socket to the second USB host interface, and couples a third USB device that is plugged into the USB socket to the USB device interface.

19 Claims, 7 Drawing Sheets

SYSTEM AND METHOD FOR AUTOMATIC DETECTION AND SWITCHING BETWEEN USB HOST AND DEVICE ROLLS ON A TYPE-A CONNECTOR

FIELD OF THE DISCLOSURE

This disclosure relates generally to information handling systems, and more particularly relates to the automatic detection and switching between USB host and device rolls on a type-A connector.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A USB interface is an asymmetrical communication topology where a host, or master, provides a socket to which a peripheral device, or slave, can be connected. An information handling system can include a Universal Serial Bus (USB) interface connected to a service processor.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purpose of this disclosure an information handling system can be implemented on one or more information handling system. An information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An example of an information handling system includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 1:
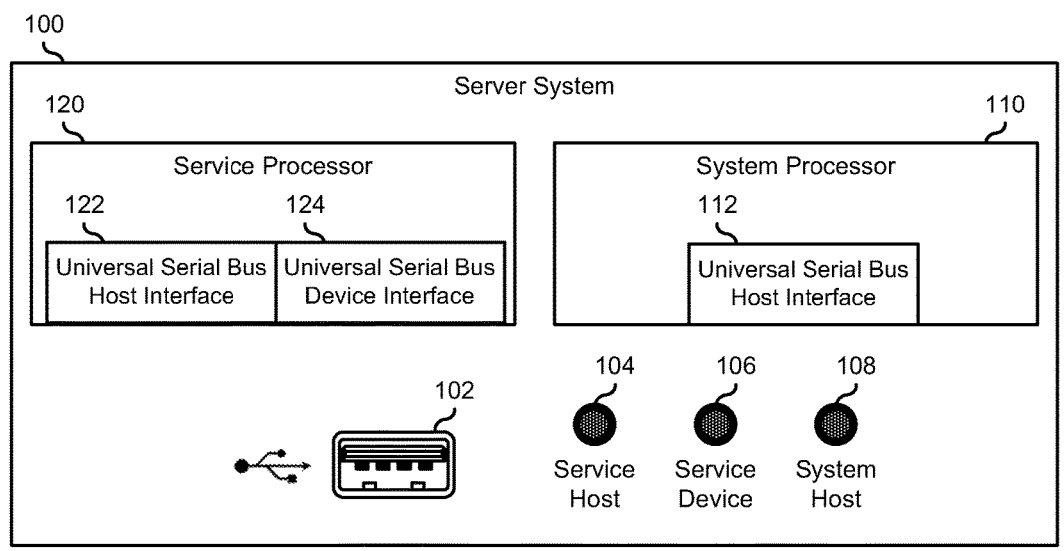
FIGS. 1-4 are block diagrams illustrating a server system that automatically detects and switches between USB host and device roles according to an embodiment of the present disclosure.

FIG. 1 illustrates a server system 100 including a USB socket 102, a service host indicator 104, a service device indicator 106, a system host indicator 108, a system processor 110, and a service processor 120. System processor 110 includes a USB host interface 112. Service processor 120 includes a USB host interface 122 and a USB device interface 124. In a particular embodiment, USB socket 102 is a Type-A USB socket.

Server system 100 represents a managed information handling system that provides a generalized computing capability to a network. As such, system processor 110 includes a processor complex that provides one or more central processing units (CPUs), memory storage such as random access memory (RAM), read-only memory (ROM), long term storage such as disk storage or non-volatile RAM (NVRAM), and input/output (I/O) and network connectivity functions. The skilled artisan will recognize that other elements can be included in system processor 110, as needed or desired.

Server system 100 also provides for out-of-band management of the server system via an Intelligent Platform Management Interface (IPMI). As such, service processor 110 represents a separate microcontroller system of server system 100 that manages an interface between system management software and the hardware elements of the server system, and that operates separately from the computing environment provided by system processor 110. In a particular embodiment, service processor 120 operates in accordance with the IPMI V2.0 Specification, Feb. 14, 2004, and other remote and local management protocols, as needed or desired. The skilled artisan will recognize that service processor 120 can include other elements, such as RAM, ROM, NVRAM, I/O, and network connectivity, and the like, as needed or desired. An example of service processor 120 includes a baseboard management controller (BMC), an Integrated Dell Remote Access Controller (iDRAC), another service processor, or a combination thereof, as needed or desired.

USB host interfaces 112 and 122 operate as USB masters for USB socket 102, such that, when a USB device that is configured as a slave device is plugged in to the USB socket, one of the USB host interfaces initiates data transfer requests with the USB device, and the USB device responds to the requests. In a particular embodiment, USB host interface 122 is the default host interface, such that, when the USB slave device is detected, USB host interface 122 determines if the USB slave device is intended for USB host interface 122, or for USB host interface 112. Here, if the USB slave device is intended for USB host device 122, then USB host interface 122 retains mastery of the USB slave device and initiates data transfer requests with the USB slave device as directed by service processor 120. If the USB slave device is intended for USB host interface 112, then USB host interface 122 operates to switch the mastery of the USB slave device to USB host interface 112. USB host interface 112 then initiates data transfer requests with the USB slave device as directed by system processor 140. USB device interface 124 operate as USB slave for USB socket 102, such that, when a USB device that is configured as a master device is plugged in to the USB socket, USB device interface 124 receives data transfer requests from the USB master device, and the USB device interface responds to the requests. In a particular embodiment, USB device interface 124 is selected based upon a determination that a USB host is connected to USB socket 102, as described below.

Thus server system 100 operates in one of three modes, based upon a detection of the type of device that is connected to the USB socket 102. In the first mode, a USB slave device is connected to USB host interface 122. In the second mode, a USB master is connected to USB device interface 124. Finally, in the third mode, a different USB slave device is connected to USB host interface 112. Indicators 104, 106, and 108 operate to identify which mode that server system 100 is operating in. In particular, service host indicator 104 indicates that server system 100 is operating in the first mode, service device indicator 106 indicates that the server system is operating in the second mode, and system host indicator 108 indicates that the server system is operating in the third mode. Note that, as described herein, service host indicator 104, service device indicator 106, and system host indicator 108 are described from the perspective of server system 100. However, service host indicator 104, service device indicator 106, and system host indicator 108 can be equally described from the perspective of the device that is plugged in to server system 100, as needed or desired.

Figure 2:
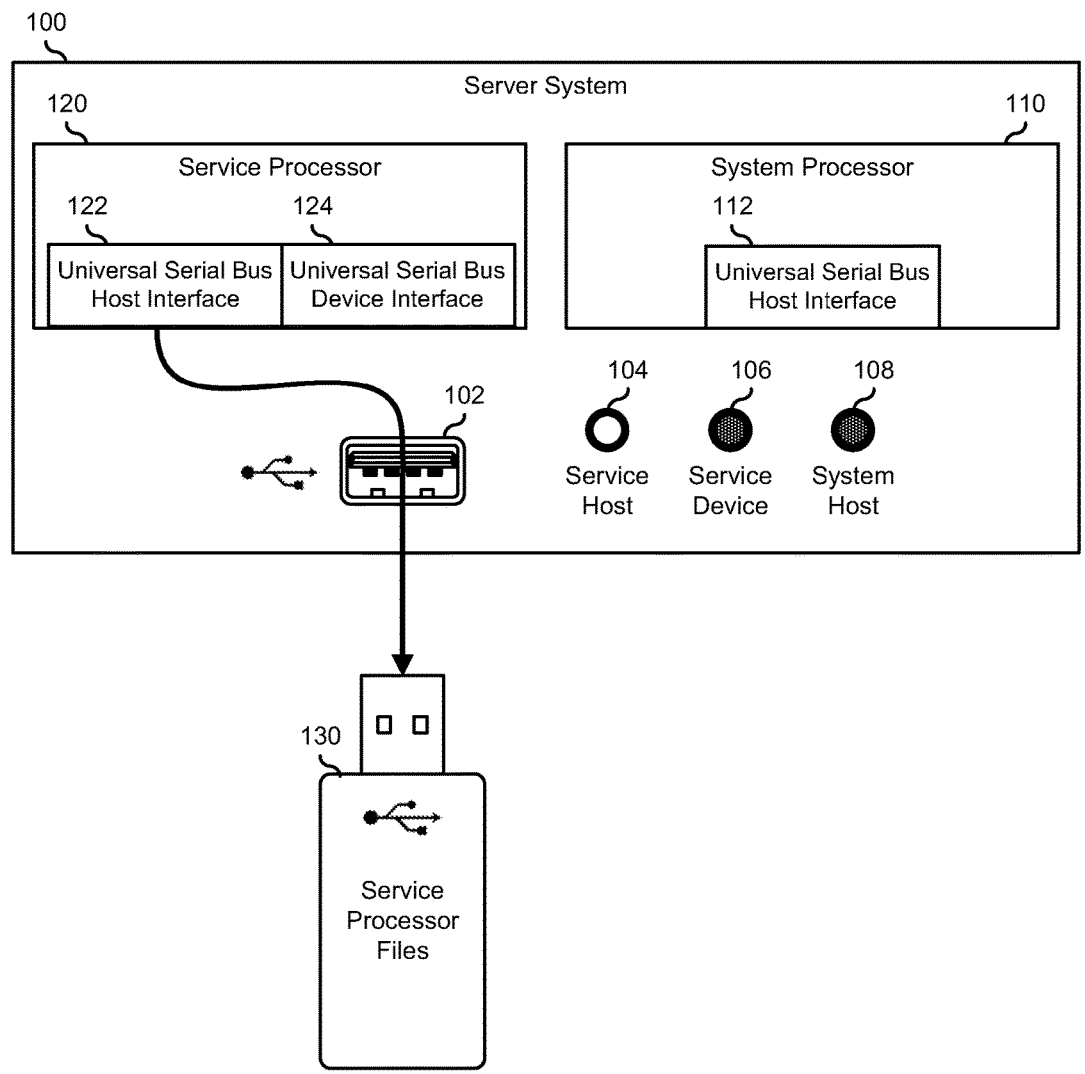

FIG. 2 illustrates the first mode where server system 100 is connected to a USB slave device 130. Here, when USB slave device 130 is detected, USB host interface 122 determines that the USB slave device is intended for USB host interface 122, retains mastery of the USB slave device, and initiates data transfer requests with the USB slave device as directed by service processor 120. Service host indicator 104 indicates that server system 100 is operating in the first mode. USB host interface 122 determines that USB slave device 130 is intended for USB host interface 122 based upon the data contents of the USB slave device. In a particular embodiment, service processor 120 directs USB host interface 122 to issue transactions to USB slave device 130 in order to determine if a particular directory or directory structure is present, if a particular file type is present, if other data content is present, or a combination thereof. For example, service processor 120 can direct USB host interface 122 to issue transactions to USB slave device 130, and can determine that the USB slave device includes a configuration file or an update package for the service processor, or if such a file or package is included in a predetermined directory of the USB slave device. The skilled artisan will recognize that USB host interface 122 provides power to USB socket 102, and detects the presence of USB slave device 130 by detecting a change in the voltage level on the data pins of the USB socket. In a particular embodiment, the particular file type includes an XML file that includes configuration file or an update package for the service processor.

Figure 3:
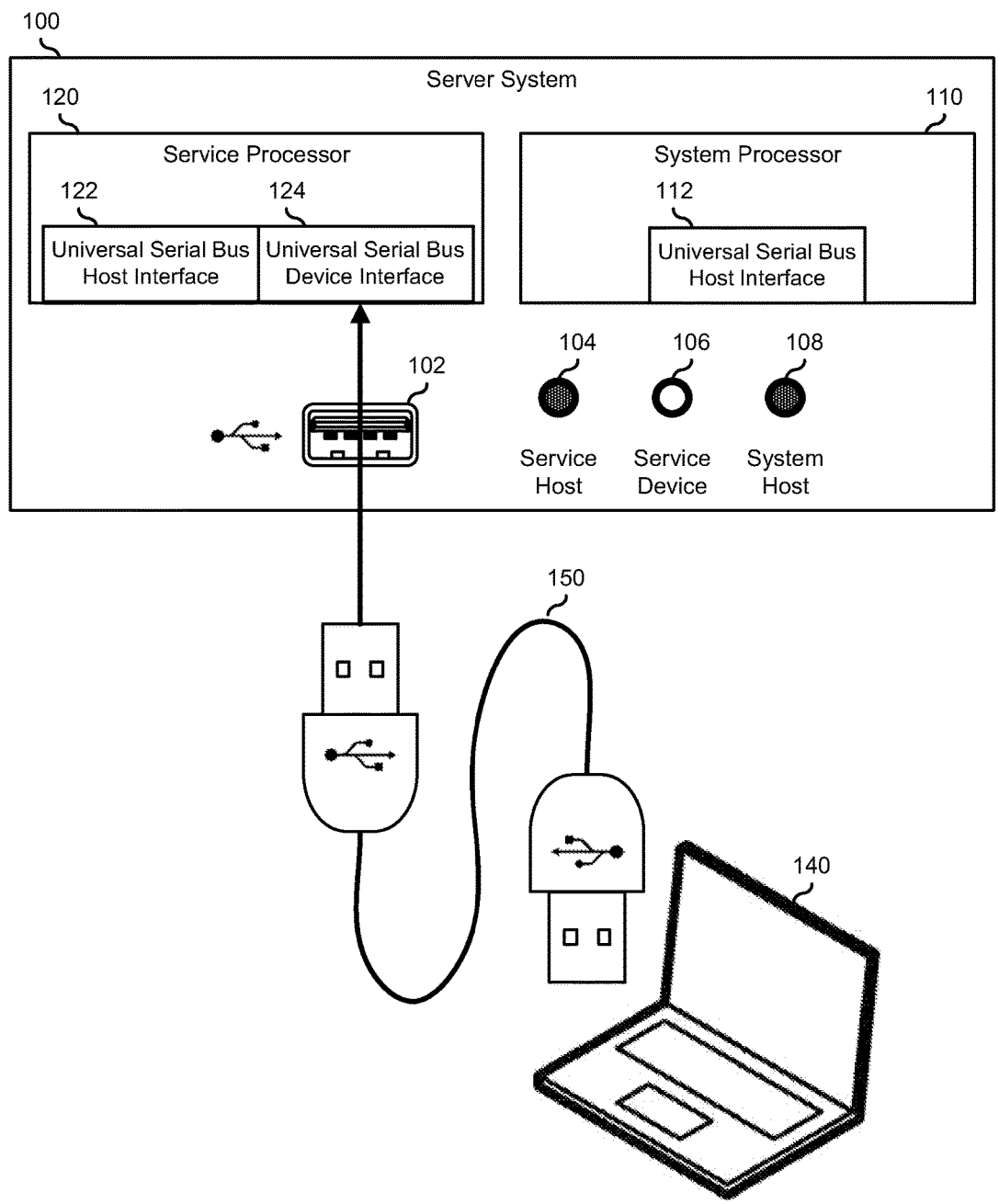

FIG. 3 illustrates the second mode where server system 100 is connected to a service system 140 via a USB master-to-master cable 150. Here, no device is detected by USB host interface 122 because service system 140 is not a USB slave device. In this case, service processor 120 switches from providing power to USB socket 102 to receiving power from service system 140, and the service system is detected by the presence of the voltage at the USB socket. When service system 140 is detected, USB device interface 124 receives transaction requests from the service system, and responds to the requests. For example, a system administrator can access the functions of service processor 120, such as monitoring and control of the hardware of server system 100.

In a particular embodiment, service processor 120 cycles between a device detection mode and a host detection mode. In the device detection mode, USB host interface 122 provides power to USB socket 102, and detects the presence of a USB slave device by detecting a change in the voltage level on the data pins of the USB socket, and in the host detection mode, the USB host interface receives power from the USB socket and responds to data transaction requests from a USB host.

Figure 4:
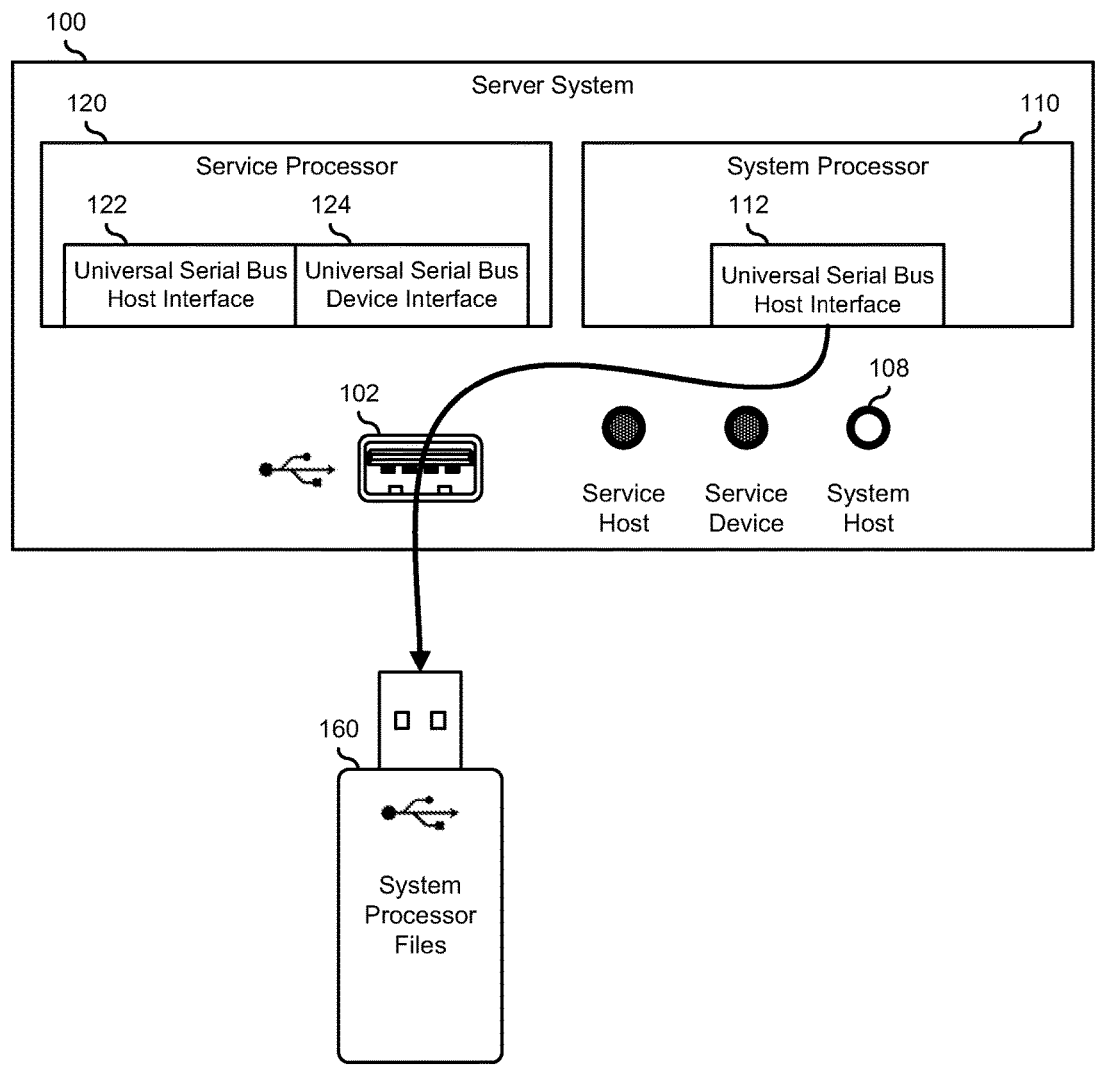

FIG. 4 illustrates the third mode where server system 100 is connected to a USB device 160. Here, when USB slave device 160 is detected, USB host interface 122 determines that the USB slave device is intended for USB host interface 112, and switches the mastery of the USB slave device to USB host interface 112. USB host interface 112 then initiates data transfer requests with USB slave device as directed by system processor 140. System host indicator 108 indicates that server system 100 is operating in the third mode. USB host interface 122 determines that USB slave device 160 is intended for USB host interface 112 based upon the data contents of the USB slave device. In a particular embodiment, service processor 120 directs USB host interface 122 to issue transactions to USB slave device 160 in order to determine if the particular directory or directory structure is present, if the particular file type is present, if the other data content is present, or a combination thereof. For example, service processor 120 can direct USB host interface 122 to issue transactions to USB slave device 130, and can determine that the USB slave device does not include a configuration file or an update package for the service processor, or if such a file or package is included in a predetermined directory of the USB slave device. As noted above, the skilled artisan will recognize that USB host interface 112 provides power to one of the pins of USB socket 102, and detects the presence of USB slave device 160 by detecting a change in the voltage level on the data pins of the USB socket.

In a particular embodiment, the functions of service host indicator 104, service device indicator 106, and system host indicator 108 as described above are performed by a single indicator. For example, the connectivity of server system 100 to USB device 140, as illustrated in FIG. 1, can be indicated by a first light pattern, such as a constantly lit indicator, the connectivity of the server system to service system 160, as illustrated in FIG. 2, can be indicated by a second light pattern, such as a slowly blinking indicator, and the connectivity of the server system to USB device 170, as illustrated in FIG. 3, can be indicated by a third light pattern, such as a quickly blinking indicator. In another example, the single indicator can be configured as a multi-color indicator, and each of the cases as illustrated in FIGS. 2-4 can be indicated by a different color.

Figure 5:
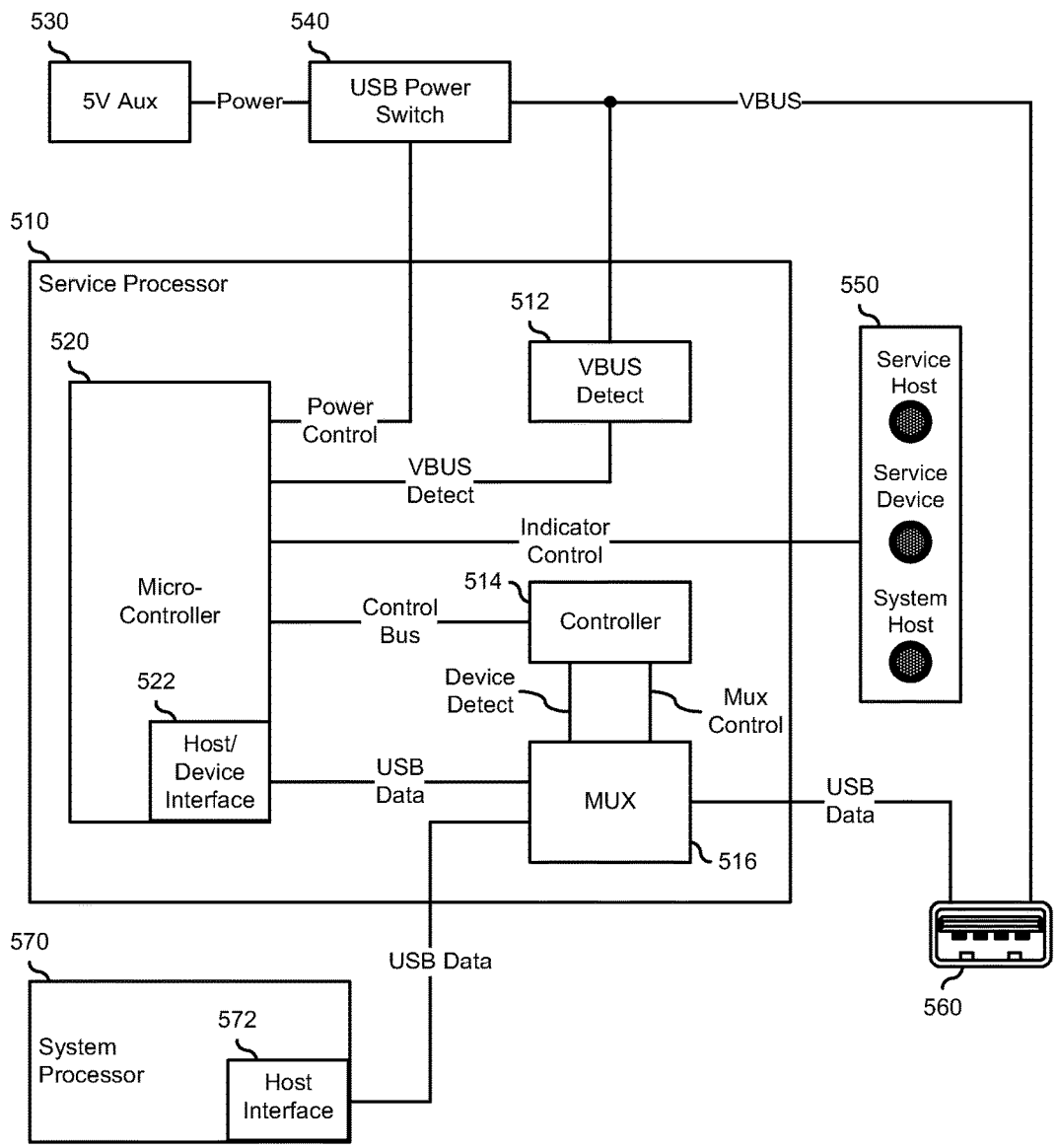
FIG. 5 is a block diagram illustrating a server system that automatically detects and switches between USB host and device roles according to another embodiment of the present disclosure.

FIG. 5 illustrates a server system 500 similar to server system 100, and including a service processor 510 similar to service processor 120, a power source 530, a USB power switch 540, an indicator panel 550, a USB socket 560, and a system processor 570 similar to system processor 110. Service processor 510 includes a voltage detector 512, a controller 514, a multiplexer 516, and a micro-controller 520. Micro-controller 520 includes a host/device data interface 522. System processor 570 includes a host data interface 572.

USB power switch 540 receives 5 Volt (V) auxiliary power from power source 530, and operates to provide the 5V auxiliary power to the VBUS pin of USB socket 560 based upon a power control signal received from micro-controller 520. The VBUS pin of USB socket 560 is also connected to voltage detector 512 which provides a VBUS detection indication to micro-controller 520. Micro-controller 520 provides an indicator control signal to indicator panel 550, indicating whether no USB device is connected to USB socket 560 (all indicators are off), a USB slave device is connected that is for service processor 510 (a service host indicator is on), a USB host is connected (a service device indicator is on), or a USB slave device is connected that is for system processor 570 (a system host indicator is on).

The input pins of USB socket 560 are provided to the input of multiplexer 516. One of the outputs of multiplexer 516 is provided to host/device data interface 522, and another output is provided to host data interface 572. Micro-controller 520 is connected via a control bus to controller 514 to direct the controller to provide a multiplexer control signal to multiplexer 516, directing the multiplexer to route the USB data pins from USB socket 560 to one of host/device data interface 522 or host data interface 572. Controller 514 also receives a device detect indication from multiplexer 516, and provides the device detect indication via the control bus to micro-controller 520. The skilled artisan will recognize that multiplexer 516 operates to provide bidirectional data transfers.

Server system 500 operates in a USB host mode or in a USB device mode. In the, USB host mode, micro-controller 520 provides the power control signal to USB power switch 540, directing the USB power switch to connect the VBUS pin of USB socket 560 to the 5V auxiliary power. Here, voltage detector 512 detects the presence of the 5V auxiliary power and provides the VBUS detection indication to micro-controller 520. However, since micro-controller 520 is in the USB host mode, the VBUS detection indication can be ignored by the micro-controller. Micro-controller 520 also directs controller 514 to provide the multiplexer control signal to multiplexer 516, directing the multiplexer to route the USB data pins from USB socket 560 to host/device data interface 522.

In the USB host mode, when the voltage level on the data pins of USB socket 560 change, indicating that a USB slave device has been connected to the USB socket, the voltage level change is detected by controller 514 and micro-controller 520 directs host/device data interface 522 to examine the contents of the USB slave device. If the contents of the USB slave device includes a particular directory or directory structure, or a particular file type or other data content is present, then the USB slave device is determined to be for service processor 510, and host/device data interface 522 initiates data transfer requests with the USB slave device as directed by the service processor. Micro-controller 520 also provides the indicator control signal to indicator panel 550 to turn on the service host indicator. When the USB slave device is disconnected from USB socket 560, controller 514 detects the resulting change to the voltage levels on the data pins of the USB socket, and server system 500 either continues in the USB host mode until another USB slave device is connected to the USB socket, or enters a USB device mode, as described below. Micro-controller 520 also provides the indicator control signal to indicator panel 550 to turn off the service host indicator If the contents of the USB slave device does not include the particular directory or directory structure, or the particular file type or other data content is not present, then the USB slave device is determined to be for system processor 570, and micro-controller 520 directs controller 514 to provide the multiplexer control signal to multiplexer 516, directing the multiplexer to route the USB data pins from USB socket 560 to host data interface 572, and the host data interface initiates data transfer requests with the USB slave device as directed by system processor 570. Micro-controller 520 also provides the indicator control signal to turn on the system host indicator. When the USB slave device is disconnected from USB socket 560, controller 514 detects the resulting change to the voltage levels on the data pins of the USB socket, and server system 500 either continues in the USB host mode until another USB slave device is connected to the USB socket, or enters a USB device mode, as described below. Micro-controller 520 also provides the indicator control signal to indicator panel 550 to turn off the system host indicator.

In the USB device mode, micro-controller 520 provides the power control signal to USB power switch 540, directing the USB power switch to disconnect the VBUS pin of USB socket 560 from the 5V auxiliary power. Here, voltage detector 512 initially detects the presence of the 5V auxiliary power, but after a suitable discharge period, detects the absence of the 5V auxiliary power unless a USB host is connected to USB socket 560, thereby providing a persistent 5V power level to the voltage detector. Here further, micro-controller 520 operates to wait a predetermined amount of time, based upon the discharge period, and then makes a determination as to whether or not a USB host is connected to USB socket 560, based upon the VBUS detection indication received from voltage detector 512. In the USB device mode, micro-controller 520 also directs controller 514 to provide the multiplexer control signal to multiplexer 516, directing the multiplexer to route the USB data pins from USB socket 560 to host/device data interface 522. In this way, when a USB host is connected to USB socket 560, service processor 510 operates as a USB slave device and responds to the data transfer requests initiated by the USB host device. Micro-controller 520 also provides the indicator control signal to turn on the service device indicator. When the USB host is disconnected from USB socket 560, voltage detector 512 detects the resulting change to the voltage level on the VBUS pin of USB socket 560, and server system 500 either continues in the USB device mode until another USB host is connected to the USB socket, or reenters the USB host mode. Micro-controller 520 also provides the indicator control signal to indicator panel 550 to turn off the service device indicator.

In a particular embodiment, service processor 510 operates to periodically cycle back and forth between the USB host mode and the USB device mode whenever no devices are detected as being connected to USB socket 560. For example, service processor 510 can direct a transition between the USB host mode and the USB device mode once every second, once every two seconds, once every 500 milliseconds (msec), or more or less frequently as needed or desired. In another embodiment, the relative durations in the USB host mode and in the USB device mode are not equal, as needed or desired. For example, the duration of the USB host mode can be longer or shorter than the duration of the USB device mode. In another embodiment, the transition between the USB host mode and the USB device mode can involve a particular amount of time for the 5V power level on the VBUS pin of USB socket 560 to settle or to fade away. In this embodiment, one or more of the detections of the presence of a USB slave device or a USB host can be delayed by an appropriate amount of time to account for the voltage rise or the voltage decay, as needed or desired. For example, the detection of a USB slave device can be delayed by 210 msec after the 5V auxiliary power level is provided to the VBUS pin of USB socket 560, and the detection of a USB host can be delayed by 250 msec after the 5V auxiliary power level is removed from the VBUS pin. Other delay durations can be utilized as needed or desired.

Figure 6:
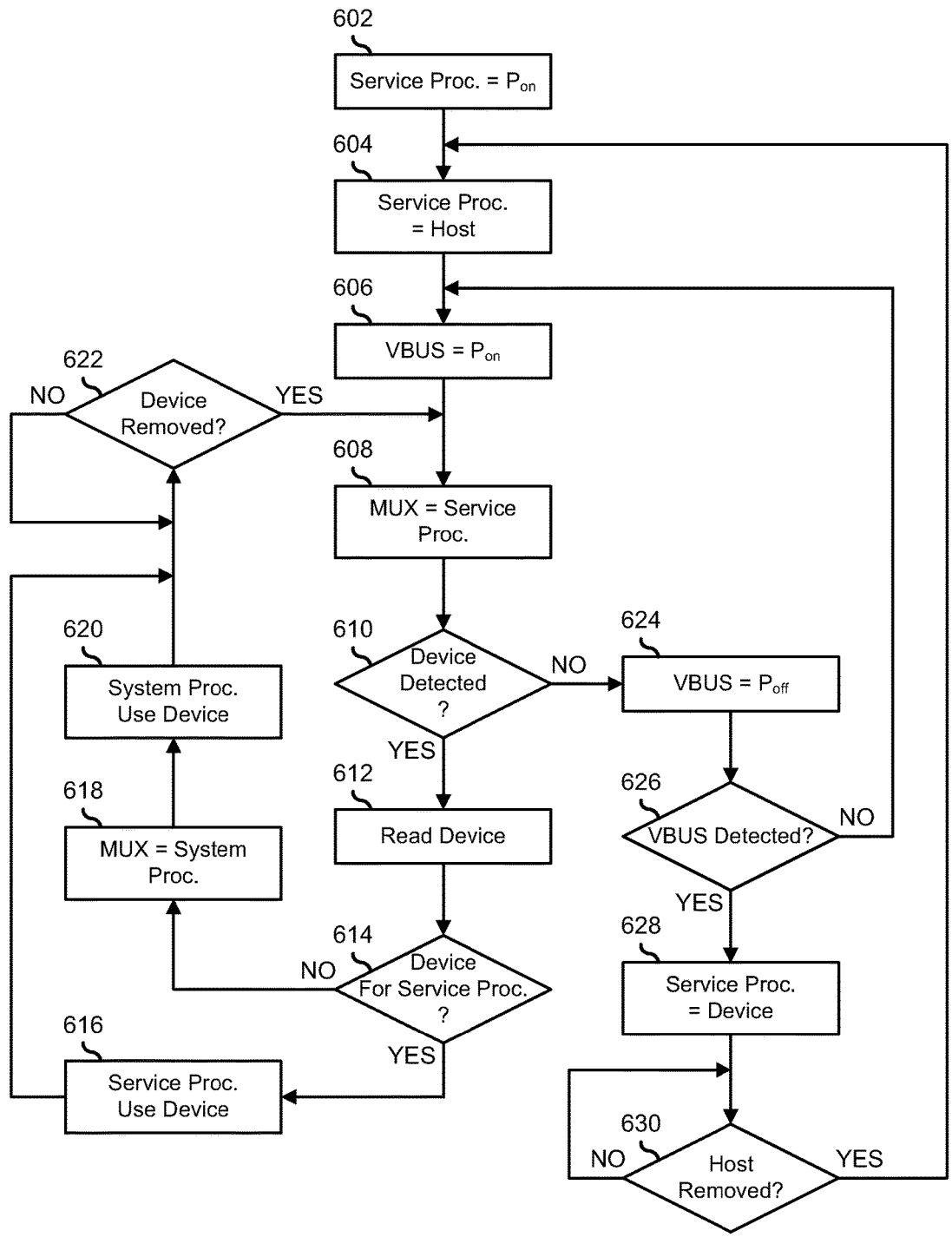
FIG. 6 is a flowchart illustrating a method for automatic detection and switching between USB host and device roles according to an embodiment of the present disclosure.

FIG. 6 illustrates a method for the automatic detection and switching between USB host and device rolls starting with block 602 where a service processor is powered on. For example, micro-controller 520 can be powered on. The service processor is set to operate as a USB host in block 604. Thus, micro-controller 520 can set host/device data interface 522 to operate as a USB host. A VBUS pin of a USB socket is provided with power in block 606. Here, micro-controller 520 can provide the power control signal to USB power switch 540, directing the USB power switch to connect the VBUS pin of USB socket 560 to the 5V auxiliary power.

A multiplexer is set to provide USB data signals to the service processor in block 608. For example, micro-controller 520 can direct controller 514 to provide the multiplexer control signal to multiplexer 516, directing the multiplexer to route the USB data pins from USB socket 560 to host/device data interface 522. A decision is made as to whether or not a USB device is detected as being plugged into the USB socket in decision block 610. For example, when the voltage level on the data pins of USB socket 560 change, indicating that a USB slave device has been connected to the USB socket, the voltage level change is detected by controller 514. If a USB device is detected as being plugged into the USB socket, the "YES" branch of decision block 610 is taken and the USB device is read by the USB host in block 612. Thus, micro-controller 520 can direct host/device data interface 522 to examine the contents of the USB slave device to determine if the USB slave device includes a particular directory or directory structure, or a particular file type or other data content is present.

A decision is made as to whether or not the USB slave device is for the service processor in decision block 614. If so, the "YES" branch of decision block 614 is taken and the service processor uses the USB slave device in block 616. For example, service processor 510 can access the USB slave device to install a configuration file or an update package for the service processor. A determination is made as to whether or not the USB slave device has been removed in decision block 622. For example, controller 514 can detect the resulting change to the voltage levels on the data pins of USB socket 560 when the USB slave device is removed from the USB socket. If the USB slave device has not been removed, the "NO" branch of decision block 622 is taken, and the method loops back to decision block 622 until a device is removed. When the USB device is removed from the USB socket, the "YES" branch of decision block 622 is taken and the method returns to block 608 where the multiplexer is reset to provide USB data signals to the service processor.

Returning to decision block 614, if the USB slave device is not for the service processor, then the "NO" block is taken and the multiplexer is set to provide USB data signals to a system processor in block 618. For example, micro-controller 520 can direct controller 514 to provide the multiplexer control signal to multiplexer 516, directing the multiplexer to route the USB data pins from USB socket 560 to host data interface 572. The system processor uses the USB slave device in block 620 and the method proceeds to decision block 622 where a determination is made as to whether or not the USB slave device has been removed.

Returning to decision block 610, if a USB device is not detected as being plugged into the USB socket, then the "NO" branch is taken and power is removed from the VBUS pin of the USB socket in block 624. For example, micro-controller 520 can provide the power control signal to USB power switch 540, directing the USB power switch to disconnect the VBUS pin of USB socket 560 from the 5V auxiliary power. A determination is made as to whether or not a voltage is detected on the VBUS pin in decision block 626. If not, the "NO" branch of decision block 626 is taken and the method returns to block 606 where the VBUS pin is provided with power. If a voltage is detected on the VBUS pin, the "YES" branch of decision block 626 is taken and the service processor is set to operate as a USB slave device in block 628. Thus, micro-controller 520 can set host/device data interface 522 to operate as a USB slave device. A determination is made as to whether or not the USB host has been removed in decision block 630. For example, a USB host can be disconnected from USB socket 560 and voltage detector 512 can detect the resulting change to the voltage level on the VBUS pin of USB socket 560. If the USB host has not been removed, the "NO" branch of decision block 630 is taken and the method loops back to decision block

630 until the USB host is removed. When the USB host is removed from the USB socket, the "YES" branch of decision block 630 is taken and the method returns to block 604 where the service processor is reset to operate as a USB host.

Figure 7:
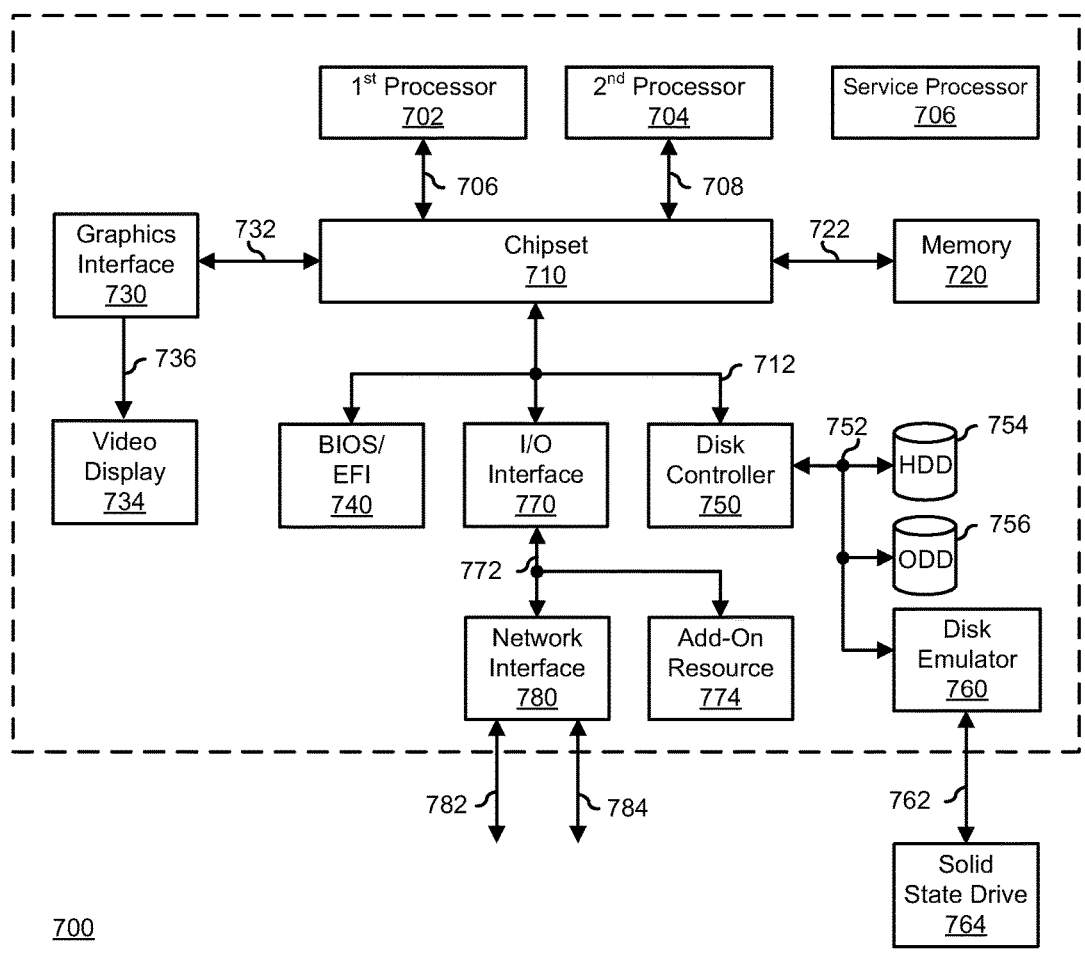
FIG. 7 is a block diagram illustrating a generalized information handling system according to an embodiment of the present disclosure.

FIG. 7 illustrates a generalized embodiment of information handling system 700. For purpose of this disclosure information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described above, and operates to perform one or more of the methods described above. Information handling system 700 includes processors 702 and 704, a service processor 706, a chipset 710, a memory 720, a graphics interface 730, include a basic input and output system/extensible firmware interface (BIOS/EFI) module 740, a disk controller 750, a disk emulator 760, an input/output (I/O) interface 770, and a network interface 780. Processor 702 is connected to chipset 710 via processor interface 706, and processor 704 is connected to the chipset via processor interface 708. Memory 720 is connected to chipset 710 via a memory bus 722. Graphics interface 730 is connected to chipset 710 via a graphics interface 732, and provides a video display output 736 to a video display 734. In a particular embodiment, information handling system 700 includes separate memories that are dedicated to each of processors 702 and 704 via separate memory interfaces. An example of memory 720 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 740, disk controller 750, and I/O interface 770 are connected to chipset 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 710 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 740 includes BIOS/EFI code operable to detect resources within information handling system 700, to provide drivers for the resources, initialize the resources, and access the resources. BIOS/EFI module 740 includes code that operates to detect resources within information handling system 700, to provide drivers for the resources, to initialize the resources, and to access the resources.

Disk controller 750 includes a disk interface 752 that connects the disc controller to a hard disk drive (HDD) 754, to an optical disk drive (ODD) 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits a solid-state drive 764 to be connected to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O interface 770 includes a peripheral interface 772 that connects the I/O interface to an add-on resource 774 and to network interface 780. Peripheral interface 772 can be the same type of interface as I/O channel 712, or can be a different type of interface. As such, I/O interface 770 extends the capacity of I/O channel 712 when peripheral interface 772 and the I/O channel are of the same type, and the I/O interface translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as chipset 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
    a system processor including a first Universal Serial Bus (USB) host interface;
    a service processor including a second USB host interface and a USB device interface;
    a USB socket;
    a first indicator;
    a second indicator; and
    a third indicator;
    the service processor operable to:
        detect that a first USB device that is plugged into the USB socket is a USB slave device;
        determine that the first USB device does not include content for the service processor based upon a file location of the content;
        couple the first USB device to the first USB host interface in response to determining that the first USB device does not include content for the service processor;
        activate the first indicator in response to coupling the first USB device to the first USB host interface;
        couple a second USB device that is plugged into the USB socket to the second USB host interface;
        activate the second indicator in response to coupling the second USB device to the second USB host interface;
        couple a third USB device that is plugged into the USB socket to the USB device interface; and
        activate the third indicator in response to coupling the third USB device to the USB device interface.

2. The information handling system of claim 1, wherein the service processor is further operable to:
    detect that the second USB device is a USB slave device;
    determine that the second USB device includes content for the service processor; and
    couple the second USB device to the second USB host interface in response to determining that the second USB device includes content for the service processor.

3. The information handling system of claim 1, further comprising:
    a power switch;
    wherein the service processor is further operable in a first mode to:
        direct the power switch to couple a power pin of the USB socket to a power source;
        detect a voltage level change on a data pin of the USB socket; and
        determine that one of the first USB device and the second USB device is plugged into the USB socket based upon the detection of the voltage level change on the data pin.

4. The information handling system of claim 1, further comprising:
    a multiplexer including:
        an input coupled to a data pin of the USB socket;
        a first output coupled to the first device interface; and
        a second output coupled to the second device interface and to the host interface;
    wherein the service processor is further operable to:
        direct the multiplexer to couple the input to the first output when the first USB device is plugged into the USB socket; and
        direct the multiplexer to couple the input to the second output when one of the second USB device and the third USB device is plugged into the USB socket.

5. The information handling system of claim 2, wherein the service processor is further operable to:
    detect that the third USB device is a USB host; and
    couple the third USB device to the USB device interface in response to determining that the third USB device is a USB host.

6. The information handling system of claim 3, wherein the service processor is further operable in the first mode to:
    initiate a data transfer request to the one of the first USB device and the second USB device;
    determine that the one of the first USB device and the second USB device includes information for the service processor; and
    determine that the one of the first USB device or the second USB device is the second USB device based upon the determination that that the information is for the service processor.

7. The information handling system of claim 3, wherein the service processor is further operable in a second mode to:
    direct the power switch to uncouple the power pin from the power source;
    detect a voltage level on the power pin; and
    determine that the third USB device is plugged into the USB socket based upon the detection of the voltage on the power pin.

8. The information handling system of claim 6, wherein the information includes one of a configuration file for the service processor, an update package for the service processor, and a predetermined directory.

9. The information handling system of claim 6, wherein the service processor is further operable in the first mode to:
    determine that the one of the first USB device and the second USB device does not include the information for the service processor; and
    determine that the one of the first USB device or the second USB device is the first USB device based upon the determination that that the information is not for the service processor.

10. A method comprising:
    plugging a first Universal Serial Bus (USB) device into a USB socket of an information handling system that includes a service processor and a system processor;
    detecting that the first USB device is a USB slave device;
    determining that the first USB device includes content for the service processor, based upon a file location of the content; and coupling the first USB device to a first USB host interface of the service processor in response to determining that the first USB device includes content for the service processor;
activating an indicator with a first light pattern in response to coupling the first USB device to the first USB host interface;
plugging a second USB device into the USB socket;
coupling the second USB device to a second USB host interface of the system processor;
activating the indicator with a second light pattern in response to coupling the second USB device to the second USB host interface;
plugging a third USB device into the USB socket;
coupling the third USB device to a USB device interface of the service processor; and
activating the indicator with a third light pattern in response to coupling the third USB device to the USB device interface.

11. The method of claim 10, further comprising:
detecting that the second USB device is a USB slave device;
determining that the second USB device does not include content for the service processor;
coupling the second USB device to the second USB host interface in response to determining that the second USB device does not include content for the service processor;
detecting that the third USB device is a USB host; and
coupling the third USB device to the USB device interface in response to determining that the third USB device is a USB host.

12. The method of claim 10, further comprising:
directing a power switch of the information handling system to couple a power pin of the USB socket to a power source;
detecting a voltage level change on a data pin of the USB socket; and
determining that one of the first USB device and the second USB device is plugged into the USB socket based upon the detection of the voltage level change on the data pin.

13. The method of claim 10, further comprising:
directing a multiplexer to couple an input of the multiplexer to a first output of the multiplexer when one of the first USB device and the third USB device is plugged into the USB socket, wherein:
the input is coupled to a data pin of the USB socket;
the first output is coupled to the USB device interface and to the first USB host interface; and
a second output of the multiplexer is coupled to the second USB host interface; and
directing the multiplexer to couple the input to the second output when the second USB device is plugged into the USB socket.

14. The method of claim 12, further comprising:
initiating a data transfer request to the one of the first USB device and the second USB device;
determining that the one of the first USB device and the second USB device includes information for the service processor;
determining that the one of the first USB device or the second USB device is the first USB device based upon the determination that that the information is for the service processor;
determining that the one of the first USB device and the second USB device does not include the information for the service processor; and
determining that the one of the first USB device or the second USB device is the second USB device based upon the determination that that the information is not for the service processor.

15. The method of claim 12, further comprising:
directing the power switch to uncouple the power pin from the power source;
detecting a voltage level the power pin; and
determining that the third USB device is plugged into the USB socket based upon the detection of the voltage on the power pin.

16. The method of claim 14, wherein the information includes one of a configuration file for the service processor, an update package for the service processor, and a predetermined directory.

17. A non-transitory computer-readable medium including code for performing a method, the method comprising:
plugging a first Universal Serial Bus (USB) device into a USB socket of an information handling system that includes a service processor and a system processor;
detecting that the first USB device is a USB slave device;
determining that the first USB device includes content for the service processor, based upon a file location of the content;
coupling the first USB device to a first USB host interface of the service processor in response to determining that the first USB device includes content for the service processor;
activating an indicator with a first light pattern in response to coupling the first USB device to the first USB host interface;
plugging a second USB device into the USB socket;
coupling the second USB device to a second USB host interface of the system processor;
activating the indicator with a second light pattern in response to coupling the second USB device to the second USB host interface;
plugging a third USB device into the USB socket;
coupling the third USB device to a USB device interface of the service processor; and
activating the indicator with a third light pattern in response to coupling the third USB device to the USB device interface.

18. The computer-readable medium of claim 17, the method further comprising:
detecting that the second USB device is a USB slave device;
determining that the second USB device does not include content for the service processor;
coupling the second USB device to the second USB host interface in response to determining that the second USB device does not include content for the service processor;
detecting that the third USB device is a USB host; and
coupling the third USB device to the USB device interface in response to determining that the third USB device is a USB host.

19. The computer-readable medium of claim 17, the method further comprising:
directing a multiplexer to couple an input of the multiplexer to a first output of the multiplexer when one of the first USB device and the third USB device is plugged into the USB socket, wherein:
the input is coupled to a data pin of the USB socket;

the first output is coupled to the USB device interface and to the first USB host interface; and
a second output of the multiplexer is coupled to the second USB host interface; and
directing the multiplexer to couple the input to the second output when the second USB device is plugged into the USB socket.

* * * * *